:::: {.columns}
::: {.column}

3,116,302
CYCLOALKADIENYL DERIVATIVES OF ALKYNYLALKOXY TETRAHYDROPYRAN AND METHOD OF PREPARATION THEREOF
John P. Luvisi, Park Ridge, Ill., assignor to Universal Oil Products Company, Des Plaines, Ill., a corporation of Delaware
No Drawing. Filed Nov. 6, 1961, Ser. No. 150,291
12 Claims. (Cl. 260—345.9)

This invention relates to novel compositions of matter which possess insecticidal properties and to a method for the preparation thereof. More specifically the invention is concerned with cycloalkadienyl derivatives of alkynylalkoxy tetrahydropyrans and to a method for preparing the same.

The use of compositions of matter which possess active insecticidal or pesticidal properties has increased at a very rapid rate during the past several years. This increase in use of new products is due in part to the fact that some insects appear to have developed a resistance to certain types of insecticides thereby rendering said insecticides impotent in controlling the growth and spread of the aforesaid insects. New and different insecticidal compositions of matter must therefore be prepared and must exhibit new and effective insecticidal properties. Therefore in view of this increased use, compositions of matter which possess the necessary toxic properties towards pests and insects, and which are economical to manufacture, would be commercially attractive articles of commerce.

It is therefore an object of this invention to prepare compositions of matter possessing insecticidal activity.

A further object of this invention is to prepare insecticidal compositions of matter comprising the cycloalkadienyl derivatives of alkynylalkoxy tetrahydropyran.

Taken in its broadest aspect one embodiment of this invention resides in a process which comprises condensing an alkynylalkoxy tetrahydropyran with a diolefinic compound selected from the group consisting of alkadienes, cycloalkadienes, haloalkadienes and halocycloalkadienes at condensation conditions, and recovering the resultant product.

A further embodiment of this invention resides in a cycloalkadiene derivative of an alkynylalkoxy tetrahydropyran.

Yet another embodiment of this invention is found in a process which comprises condensing 2-(propargyloxy) tetrahydropyran with a diolefinic compound selected from the group consisting of alkadienes, cycloalkadienes, haloalkadienes and halocycloalkadienes at a temperature in the range of from about 25° to about 250° C. and at a pressure in the range of from about 1 to about 100 atmospheres, and recovering the resultant product.

A specific embodiment of this invention is found in a process which comprises condensing 2-(1,1-dimethylpropargyloxy)tetrahydropyran with hexachlorocyclopentadiene at a temperature in the range of from about 25° to about 250° C. and at a pressure in the range of from about 1 to about 100 atmospheres, and recovering the desired 2-(1,4,5,6,7,7-hexachloro-2,5-norbornadien-2-yl-dimethylmethoxy)tetrahydropyran.

Another specific embodiment of this invention resides in 2-(1,4-dichloro-2,5-cyclohexadien-2-yl-methoxy)tetrahydropyran.

Other objects and embodiments referring to alternative alkadienes, cycloalkadienes, haloalkadienes, and halocycloalkadienes as well as alkynylalkoxy tetrahydropyrans will be found in the following further detailed description of the invention.

It has now been discovered that new compositions of matter may be prepared by the Diels-Alder reaction of a :::
::: {.column} diolefinic compound with an alkynylalkoxy tetrahydropyran, the latter compound being the adduct of a tertiary alcohol which contains an ethynyl group with a dihydropyran. The compounds thus formed by the process of this invention will find a wide variety of use in the chemical field, especially as insecticides. For example, the condensation product which results from the Diels-Alder reaction between hexachlorocyclopentadiene and 2-(1,1-dimethylpropargyloxy)tetrahydropyran, namely, 2-(1,4,5,6,7,7-hexachloro-2,5-norbornadiene-2-yl-dimethylmethoxy) tetrahydropyran will be active as an insecticide, especially against house flies. In addition, it is also contemplated that the reaction products of this invention may also be used as intermediates in the preparation of resins, pharmaceuticals, plastics, etc. For purposes of this invention, the term "cycloalkadienyl" as used hereinafter in the specification and appended claims will refer to cycloalkadienes, bicycloalkadienes, monohalo- and polyhalocycloalkadienes and bicycloalkadienes.

The process of this invention in which the diolefinic compound of the type hereinafter set forth in greater detail, either straight chain or cyclic in nature, and preferably being conjugated, is condensed with the alkynylalkoxy tetrahydropyran is effected in a Diels-Alder manner at temperatures in the range of from about atmospheric (25° C.) to about 300° C. or more, and often preferably at a temperature in the range of from about 100° to about 250° C., the temperature depending upon the reactants which undergo condensation. Generally speaking, the reaction will take place at atmospheric pressure, however, if temperatures higher than the boiling point of the reactants are to be employed, superatmospheric pressure ranging from about 2 to about 100 atmospheres or more will be used in the reaction, the amount of pressure being that which is necessary to maintain at least a portion of the reactants in the liquid phase, said pressure being supplied by the addition of a third gas, such as nitrogen, to the reaction zone. In addition, if so desired, the reaction may be effected in the presence of an inert organic solvent including aromatic hydrocarbons such as benzene, toluene, o-xylene, m-xylene and p-xylene, etc.; alcohols such as methyl alcohol, ethyl alcohol, propyl alcohol, etc.; ethers such as dimethyl ether, diethyl ether, dipropyl ether, etc.; paraffinic hydrocarbons both straight chain and cyclic such as pentane, hexane, heptane, cyclopentane, methylcyclopentane, cyclohexane, etc.

Diolefinic compounds which are utilized as one of the starting materials in the process of the present invention, and which contain only carbon and hydrogen atoms include straight chain diolefins such as 1,3-butadiene, 2-methyl-1,3-butadiene, 2,3-dimethyl-1,3-butadiene, 1,3-pentadiene, 2-methyl-1,3-pentadiene, 2,3-dimethyl-1,3-cyclopentadiene, 2,4-pentadiene, 2-methyl-2,4-pentadiene, 1,3-hexadiene, 2-methyl-1,3-hexadiene, 2,3-dimethyl-1,3-hexadiene, the isomeric heptadienes, octadienes, etc.; cyclic diolefins including 1,3-cyclopentadiene, 1,3-cyclohexadiene, 1,3-cycloheptadiene, the alkyl substituted cycloalkadienes such as the isomeric methyl-1,3-cyclopentadienes, etc.; halo substituted diolefins containing only carbon, hydrogen and halogen atoms including straight chain halogenated diolefins having the general formula:

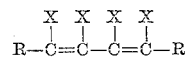

in which each of the X radicals is independently selected from the group consisting of hydrogen and halogen radicals having an atomic weight of from 35 to 127 (i.e. chlorine, bromine or iodine) at least one X being halogen, and each of the R radicals is independently selected from the group consisting of hydrogen and alkyl radicals containing from 1 to 6 carbon atoms, or polyhalocycloalka-

:::
::::

dienes containing only carbon, hydrogen and halogen atoms having the general formula:

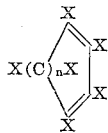

in which X has the same meaning as above. Examples of these compounds include haloalkadienes such as 1-chloro-1,3-butadiene, 1,3-dichloro-1,3-butadiene, 1-bromo-1,3-butadiene, 1,3-dibromo-1,3-butadiene, 1,3-diiodo-1,3-butadiene, 2,3-dichloro-1,3-butadiene, 2,3-dibromo-1,3-butadiene, 2,3-diiodo-1,3-butadiene, 1,2,3-trichloro-1,3-butadiene, 1,2,3-tribromo-1,3-butadiene, 1-iodo-1,3-butadiene, 1,2-diiodo-1,3-butadiene, 1,2,3-triiodo-1,3-butadiene, 1,2,3,4-tetrachloro-1,3-butadiene, 1,2,3,4-tetrabromo-1,3-butadiene, 1,2,3,4-tetraiodo-1,3-butadiene, 1,3 - dichloro - 2-methyl-1,3-butadiene, 2-chloromethyl-1,3-butadiene, 1,4-dichloro-2-methyl-1,3-butadiene, 1,4-dichloro-2 - chloromethyl-1,3-butadiene, 1,4-dichloro-2-dichloromethyl-1,3-butadiene, 1,3-dibromo-2-methyl-1,3-butadiene, 1,4-dibromo-2-methyl-1,3-butadiene, 1,4-dibromo - 2 - bromomethyl-1,3-butadiene, 1,4-dibromo-2-dibromomethyl-1,3-butadiene, 1,3-diiodo-2-methyl-1,3-butadiene, 1,4-diiodo-2-methyl-1,3-butadiene, 1,4-diiodo-2-iodomethyl-1,3 - butadiene, 1,4-diiodo-2-diiodomethyl-1,3-butadiene, etc.; and halocycloalkadienes, such as halogenated 1,3-cyclopentadienes which for purposes of this invention will be designated as halogenated cyclopentadienes including 1-, 2-, or 5-chlorocyclopentadiene, 1,5-, 5,5-, 2,3-, 1,4-, 1,2-, or 1,3-dichlorocyclopentadiene, 1,5,5-, 1,2,5-, 1,3,5-, 1,2,4,-, 2,5,5-, 1,4,5-, or 1,2,3-trichlorocyclopentadiene, 2,3,5,5-, 1,2,3,5-, 1,2,4,5-, 1,2,3,4-, 1,3,5,5-, 1,2,5,5-, or 1,4,5,5-tetrachlorocyclopentadiene, 1,2,3,5,5-, 1,2,4,5,5-, or 1,2,3,4,5-pentachlorocyclopentadiene, hexachlorocyclopentadiene, the corresponding monobromocyclopentadienes, polybromocyclopentadienes, monoiodocyclopentadienes, polyiodocyclopentadienes, etc.; 1,2-dichloro-1,3-cyclohexadiene, 1,2,3-trichloro-1,3-cyclohexadiene, octachloro-1,3-cyclohexadiene, etc., 1,2-dibromo-1,3-cyclohexadiene, 1,2,3-tribromo-1,3-cyclohexadiene, octabromo-1,3-cyclohexadiene, 1,2-diiodo-1,3-cyclohexadiene, 1,2,3-triiodo-1,3-cyclohexadiene, octaiodo-1,3-cyclohexadiene, etc. In addition, it is also contemplated that polyhaloalkadienes and polyhalocycloalkadienes which are used in this process may contain more than one species of halo substituents, such as, for example, 1,2-dichloro-3-bromo-1,3-butadiene, 1-chloro-3-bromo-1,3-butadiene, 1-iodo-3-chloro-1,3-butadiene, 2-bromo-3-chloro-1,3-butadiene, 1,3-dichloro-2-bromomethyl-1,3-butadiene, 1,3-dichloro-2-iodomethyl-1,3-butadiene, 1-chloro-2-bromocyclopentadiene, 1,2-dichloro-3-bromocyclopentadiene, 1,2-dichloro-5,5-dibromocyclopentadiene, etc., may also be used although not necessarily with equivalent results.

It is to be understood that the aforementioned diolefinic compounds are only representatives of the class of compounds which may be used and that the present invention is not necessarily limited thereto.

Examples of alkynylalkoxy tetrahydropyrans which, as hereinbefore set forth, comprise adducts of a tertiary alcohol containing an ethynyl group with dihydropyrans possess the generic formula:

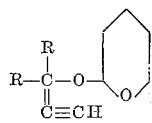

in which the R's are independently selected from the group consisting of hydrogen, alkyl, aryl, alkaryl, aralkyl and their substituted derivatives and further where the R's can make up a cycloalkyl ring, and include 2-(propargyloxy) tetrahydropyran, 2 - (1 - methylpropargyloxy)tetrahydropyran, 2-(1,1-dimethylpropargyloxy)tetrahydropyran, 2-(1-phenylpropargyloxy)tetrahydropyran, 2-(1,1-diphenylpropargyloxy)tetrahydropyran, 2-(1-benzylpropargyloxy) tetrahydropyran, 2-(1-ethylpropargyloxy)tetrahydropyran, 2-(1,1 - diethylpropargyloxy)tetrahydropyran, 2 - (1-ethylphenylpropargyloxy)tetrahydropyran, 2 - (1-propylphenylpropargyloxy)-tetrahydropyran, etc. It is to be understood, as in the case of the diolefinic compounds that the aforementioned alkynylalkoxy tetrahydropyrans are only representatives of the class of compounds which may be used and that the present invention is not necessarily limited thereto.

The physical properties of the present cycloalkadienic derivative of an alkynylalkoxy tetrahydropyran, and the effects they have on entomological forms of life make them particularly desirable as insecticides and insect repellents, the compounds having many of the features desired for materials of this purpose. They are, for example, toxic to insects which are destructive of plant life and materials normally subject to insect infestation, their toxic effects being manifested by contact of the poison with the insect. The insecticides comprising the compounds of the present invention are thus effective against chewing as well as sucking types of insects. In addition, the compounds are sufficiently volatile so that when applied to plant life intended for subsequent human consumption, the plants when harvested and after allowing a reasonable time for evaporation of the applied insecticides therefrom retain none of the toxicant to prevent use of the plant and consumption as food. On the other hand, the compounds are of sufficient limited volatility to be retained on the insect for the time required to accomplish the toxic effects of the compounds.

If so desired, the insecticide of the present invention may be combined with a diluent, said diluent being employed for the specific purpose of reducing the concentration of insecticides to the desired level in specific insecticide formulation. The particular formulation of active components in combination with the solvent or dispersant will depend upon its application. Compositions containing as high as 20% of active component may be preferred in some instances to allow deep penetration of the insecticides if so desired, as in the treatment of fibrous material, such as wood, for extinction of particular infestation, for example, wood termites. For other purposes, the required concentration of active components in the formulation may be as low as 0.1% as, for example, in the treatment of fabrics for destroying moth larvae. In utilizing the present insecticidal compounds against most insects, a composition containing from about 0.1% to about 5% by weight of the active component is highly effective. The choice of the most desirable concentration depends upon the method utilized to apply the insecticidal composition to the infested article. In addition to the use of normal solvents, the insecticides may be dissolved in a suitable high boiling solvent or may be dispersed in a low molecular weight normally gaseous carrying agent such as propane, butane, the Freons, etc. The latter may be compressed and liquefied into a small bomb containing the insecticide which, upon release of pressure therefrom, vaporizes the liquid and suspends a quantity of the active component therein, thus providing a convenient spraying method of applying the insecticide.

The process of this invention may be effected in any suitable manner and may comprise either a batch or a continuous type operation. For example, when a batch type operation is used a quantity of the starting materials comprising an alkadiene, cycloalkadiene, halo-substituted alkadiene or halo-substituted cycloalkadiene along with the alkynylalkoxy tetrahydropyran of the type hereinbefore set forth and, if so desired, an inert organic solvent or diluent is placed in a condensation apparatus provided with heating and mixing means. The flask is then heated to the desired temperature and maintained thereat for a predetermined period of time, at the end of which time the flask and contents thereof are allowed to cool to room temperature. In the event that temperatures higher than the boiling points of the starting materials are to be used the aforesaid feed stocks are placed in the glass liner of a rotating autoclave along with the diluent and said liner is thereafter sealed into the autoclave. The desired pressure is effected by the introduction of an inert gas such as nitrogen and the apparatus is thereafter heated to the desired operating temperature. Upon completion of the predetermined residence time the autoclave and contents thereof are cooled to room temperature, the excess pressure is vented and the reaction product is separated and recovered by conventional means such as fractional distillation, crystallization, etc.

Another method of effecting the condensation reaction of the present invention is by a continuous type operation. In this type of operation the starting materials comprising the alkynylalkoxy tetrahydropyran and an alkadiene, cycloalkadiene, halo-substituted alkadiene or halo-substituted cycloalkadiene are continuously charged to a reactor which is maintained at the proper operating conditions of temperature and pressure. The reactor may comprise an unpacked vessel or coil or may be lined with an adsorbent packing material such as fire brick, alumina, dehydrated bauxite and the like. If so desired, an inert organic diluent or solvent of the type hereinbefore set forth may be added through a separate line or may be admixed with one or the other of the starting materials prior to entry into said reactor and charged thereto in a single stream.

Examples of cycloalkadienic derivatives of alkynylalkoxy tetrahydropyrans which may be prepared according to the process of this invention include 2-(2,5-cyclohexadien-2-yl-methoxy)tetrahydropyran,
2-(2,5-cyclohexadien-2-yl-1-methylmethoxy)tetrahydropyran,
2-(2,5-cyclohexadien-2-yl-1,1-dimethylmethoxy)tetrahydropyran,
2-(2,5-cyclohexadien-2-yl-1-phenylmethoxy)tetrahydropyran,
2-(2,5-cyclohexadien-2-yl-1,1-diphenylmethoxy)tetrahydropyran,
2-(2,5-cyclohexadien-2-yl-1-benzylmethoxy)tetrahydropyran,
2-(1,4-dichloro-2,5-cyclohexadien-2-yl-1-methoxy)-tetrahydropyran,
2-(1,4-dichloro-2,5-cyclohexadien-2-yl-1-methylmethoxy)tetrahydropyran,
2-(1,4-dichloro-2,5-cyclohexadien-2-yl-1,1-dimethylmethoxy)tetrahydropyran,
2-(1,4-dichloro-2,5-cyclohexadien-2-yl-1-phenylmethoxy)tetrahydropyran,
2-(1,4-dichloro-2,5-cyclohexadien-2-yl-1,1-diphenylmethoxy)tetrahydropyran,
2-(1,4,5,6,7,7-hexachloro-2,5-norbornadien-2-yl-methoxy)tetrahydropyran,
2-(1,4,5,6,7,7-hexachloro-2,5-norbornadien-2-yl-1-methylmethoxy)tetrahydropyran,
2-(1,4,5,6,7,7-hexachloro-2,5-norbornadien-2-yl-1,1-dimethylmethoxy)tetrahydropyran,
2-(1,4,5,6,7,7-hexachloro-2,5-norbornadien-2-yl-1-phenylmethoxy)tetrahydropyran,
2-(1,4,5,6,7,7-hexachloro-2,5-norbornadien-2-yl-1,1-diphenylmethoxy)tetrahydropyran,
2-(1,4,5,6,7,7-hexachloro-2,5-norbornadien-2-yl-1-benzylmethoxy)tetrahydropyran,
2-(1,4,5,6,7,7-hexachloro-2,5-norbornadien-2-yl-1-ethylphenylmethoxy)tetrahydropyran, etc. It is to be understood that the hereinabove compounds are only representatives of the class of compounds which may be obtained according to the process of this invention and that said invention is not necessarily limited thereto.

The following examples are given to illustrate the process of the present invention which, however, are not intended to limit the generally broad scope of the present invention in strict accordance therewith.

Example I

In this example equal molar proportions of 2-(propargyloxy)-tetrahydropyran and 1,3-butadiene along with 25 g. of toluene are placed in the glass liner of a rotating autoclave. The liner is sealed into the autoclave and nitrogen pressed in until a pressure of about 30 atmospheres is reached. The autoclave and contents thereof are subsequently slowly heated to a temperature of about 105° C. and maintained thereat for a period of about four hours. At the end of this time the autoclave and contents thereof are allowed to cool to room temperature, the excess pressure is vented and the reaction product is recovered therefrom. The toluene is thereafter distilled off and the residue is further distilled in vacuum. From this distillation the desired reaction product comprising 2 - (2,5 - cyclohexadien-2-yl-methoxy)tetrahydropyran is separated and recovered.

Example II

A mixture of 1 molecular proportion of 2-(propargyloxy)tetrahydropyran and 1 molecular proportion of 1,4-dichloro-1,3-butadiene along with 100 cc. of toluene is placed in the glass liner of a rotating autoclave. The glass liner is sealed into the autoclave and nitrogen pressed in until an initial pressure of about 30 atmospheres is reached. Following this the autoclave and contents thereof are slowly heated to a temperature of about 100° C. and maintained thereat for a period of about five hours. At the end of this time the autoclave and contents thereof are cooled to room temperature, the excess pressure is vented and the reaction product is recovered. The product is subjected to distillation to remove the toluene and further distilled at reduced pressure. The reaction product, comprising 2-(1,4-dichloro-2,5-cyclohexadien-2-yl-methoxy)tetrahydropyran is separated and recovered.

Example III

In this example a mixture of 1 molecular proportion of 2-(1,1-dimethylpropargyloxy)tetrahydropyran and 1 molecular proportion of hexachlorocyclopentadiene along with 100 cc. of a solvent comprising benzene is placed in the glass liner of a rotating autoclave and subjected to condensation under conditions similar to that set forth above. Following the completion of the residence time the reaction product is subjected to fractional distillation and the desired product comprising 2-(1,4,5,6,7,7-hexachloro-2,5-norbornadien-2-yl - dimethylmethoxy)tetrahydropyran is separated and recovered.

Example IV

A mixture of 1 molecular proportion of 2-(1-phenylpropargyloxy)tetrahydropyran and 1 molecular proportion of hexachlorocyclopentadiene is subjected to condensation in the presence of a benzene solvent in a manner similar to that set forth in the above examples. Upon completion of the desired residence time and after distillation of the reaction product which has been recovered from the autoclave the desired product comprising 2-(1,4,5,6,7,7-hexachloro - 2,5 - norbornadien-2-yl-phenylmethoxy)tetrahydropyran is separated and recovered.

Example V

A mixture of 1 molecular proportion of 2-(1,1-dimethylpropargyloxy)tetrahydropyran and 1 molecular proportion of 1,4-dichloro-1,3-butadiene is treated in a manner similar to that set forth in Example I above. After the various steps of the condensation process as hereinbefore set forth the reaction product comprising 2-(1,4-dichloro-2,5 - cyclohexadien-2-yl-dimethylmethoxy)tetrahydropyran is separated and recovered.

Example VI

An insecticidal solution is prepared by dissolving 1 g.

of 2-(1,4,5,6,7,7 - hexachloro - 2,5-norbornadien-2-yl-dimethylmethoxy)tetrahydropyran in 2 cc. of benzene after the benzene solution is added to 100 cc. of water using 1 cc. of Triton X–100 as an emulsifying agent. This solution is sprayed into a cage containing common house flies and will cause a 100% known-down. Similar tests of other insecticides of Examples II to V will show that these compounds, like the compound of Example I, possess an equal knock-down ability with essentially equal killing power.

I claim as my invention:

1. A process which comprises condensing 2-(propargyloxy)tetrahydropyran with 1,3-butadiene at a temperature in the range of from about 25° to about 250° C. and at a pressure in the range of from about 1 to about 100 atmospheres, and recovering the resultant 2-(2,5-cyclohexadien-2-yl-methoxy)tetrahydropyran.

2. A process which comprises condensing 2-(propargyloxy)tetrahydropyran with 1,4-dichloro-1,3-butadiene at a temperature in the range of from about 25° to about 250° C. and at a pressure in the range of from about 1 to about 100 atmospheres, and recovering the resultant 2-(1,4-dichloro-2,5-cyclohexadien - 2-yl-methoxy)tetrahydropyran.

3. A process which comprises condensing 2-(1,1-dimethylpropargyloxy)tetrahydropyran with hexachlorocyclopentadiene at a temperature in the range of from about 25° to about 250° C. and at a pressure in the range of from about 1 to about 100 atmospheres, and recovering the desired 2-(1,4,5,6,7,7-hexachloro-2,5-norbornadien-2-yl-dimethylmethoxy)tetrahydropyran.

4. A process which comprises condensing 2-(1-phenylpropargyloxy)tetrahydropyran with hexachlorocyclopentadiene at a temperature in the range of from about 25° to about 250° C. and at a pressure in the range of from about 1 to about 100 atmospheres, and recovering the resultant 2-(1,4,5,6,7,7 - hexachloro - 2,5-norbornadien-2-yl-phenylmethoxy)tetrahydropyran.

5. A process which comprises condensing 2-(1,1-dimethylpropargyloxy)tetrahydropyran with 1,4-dichloro-1,3-butadiene at a temperature in the range of from about 25° to about 250° C. and at a pressure in the range of from about 1 to about 100 atmospheres, and recovering the resultant 2-(1,4-dichloro-2,5-cyclohexadien-2-yl-dimethylmethoxy)tetrahydropyran.

6. 2 - (2,5 - cyclohexadien - 2 - yl - methoxy)tetrahydropyran.

7. 2 - (1,4 - dichloro - 2,5 - cyclohexadien - 2 - yl-methoxy)tetrahydropyran.

8. 2 - (1,4,5,6,7,7 - hexachloro - 2,5 - norbornadien-2-yl-dimethylmethoxy)tetrahydropyran.

9. 2 - (1,4,5,6,7,7 - hexachloro - 2,5 - norbornadien-2-yl-phenylmethoxy)tetrahydropyran.

10. 2 - (1,4 - dichloro - 2,5 - cyclohexadien - 2 - yl-dimethylmethoxy)tetrahydropyran.

11. Tetrahydropyran having a diene-alkoxy substituent in the 2-position, the diene component of said substituent being selected from the group consisting of cyclohexadiene, dichloro-cyclohexadiene and hexachloro-norbornadiene and the alkoxy component of said substituent being selected from the group consisting of methoxy, methylmethoxy, dimethylmethoxy, phenylmethoxy, diphenylmethoxy, benzylmethoxy and ethylphenlmethoxy.

12. Tetrahdropyran having in the 2-position a diene-2-yl-methoxy substituent in which the diene component is selected from the group consisting of 2,5-cyclohexadiene, 1,4-dichloro-2,5-cyclohexadiene and 1,4,5,6,7,7-hexachloro-2,5-norbornadiene.

No references cited.